United States Patent
Yun et al.

(10) Patent No.: US 12,088,917 B2
(45) Date of Patent: Sep. 10, 2024

(54) SENSOR ACTUATOR AND CAMERA MODULE INCLUDING THE SAME

(71) Applicant: SAMSUNG ELECTRO-MECHANICS CO., LTD., Suwon-si (KR)

(72) Inventors: Tae Ho Yun, Suwon-si (KR); Sang Jong Lee, Suwon-si (KR); Han Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 142 days.

(21) Appl. No.: 18/079,246

(22) Filed: Dec. 12, 2022

(65) Prior Publication Data

US 2023/0217111 A1    Jul. 6, 2023

(30) Foreign Application Priority Data

Jan. 6, 2022    (KR) .................... 10-2022-0002129

(51) Int. Cl.
*H04N 23/68*    (2023.01)
*H02K 41/035*    (2006.01)
(Continued)

(52) U.S. Cl.
CPC ....... *H04N 23/687* (2023.01); *H02K 41/0354* (2013.01); *H04N 23/54* (2023.01);
(Continued)

(58) Field of Classification Search
CPC ...... H04N 23/687; H04N 23/54; H04N 23/57; H04N 23/55; H02K 41/0354;
(Continued)

(56) References Cited

U.S. PATENT DOCUMENTS

| | | | |
|---|---|---|---|
| 2005/0105144 A1* | 5/2005 | Konagaya | H04N 1/195 358/497 |
| 2006/0262420 A1* | 11/2006 | Matsumoto | G02B 15/177 359/676 |

(Continued)

FOREIGN PATENT DOCUMENTS

| | | |
|---|---|---|
| KR | 10-2007-0107566 A | 11/2007 |
| KR | 10-1804921 B1 | 1/2018 |

(Continued)

OTHER PUBLICATIONS

Korean Office Action issued on Jun. 1, 2023, in counterpart Korean Patent Application No. 10-2022-0002129 (6 pages in English, 5 pages in Korean).

*Primary Examiner* — Hung H Lam
(74) *Attorney, Agent, or Firm* — NSIP Law

(57) ABSTRACT

A sensor actuator includes a first movable body on which an image sensor having an imaging plane is disposed, a second movable body spaced apart from the first movable body in a direction perpendicular to the imaging plane, a fixed body accommodating the first movable body and the second movable body, and a driver configured to provide driving force to the first movable body, wherein the first movable body and the second movable body move together in a direction parallel to the imaging plane, and the first movable body rotates relative to the second movable body.

20 Claims, 10 Drawing Sheets

(51) Int. Cl.
*H04N 23/54* (2023.01)
*G02B 7/02* (2021.01)
*G03B 13/34* (2021.01)

(52) U.S. Cl.
CPC .............. *G02B 7/021* (2013.01); *G03B 13/34* (2013.01); *H02K 2201/18* (2013.01)

(58) Field of Classification Search
CPC .... H02K 2201/18; H02K 33/18; G02B 7/021; G02B 27/646; G03B 13/34; G03B 3/10; G03B 5/00; G03B 5/02; G03B 30/00
See application file for complete search history.

(56) References Cited

U.S. PATENT DOCUMENTS

| | | | |
|---|---|---|---|
| 2007/0257989 | A1 | 11/2007 | Shirono |
| 2013/0076897 | A1* | 3/2013 | Ogi ...................... G02B 21/365 |
| | | | 348/143 |
| 2018/0115715 | A1 | 4/2018 | Jung et al. |
| 2022/0286591 | A1 | 9/2022 | Seo et al. |
| 2023/0209197 | A1* | 6/2023 | Jang .................. H02K 41/0356 |
| | | | 348/208.99 |

FOREIGN PATENT DOCUMENTS

| | | |
|---|---|---|
| KR | 10-2020-0070704 A | 6/2020 |
| KR | 10-2146385 B1 | 8/2020 |
| KR | 10-2020-0124413 A | 11/2020 |
| KR | 10-2021-0026324 A | 3/2021 |

\* cited by examiner

SENSOR ACTUATOR AND CAMERA MODULE INCLUDING THE SAME

CROSS-REFERENCE TO RELATED APPLICATIONS

This application claims the benefit under 35 USC 119(a) of Korean Patent Application No. 10-2022-0002129 filed on Jan. 6, 2022, in the Korean Intellectual Property Office, the entire disclosure of which is incorporated herein by reference for all purposes.

BACKGROUND

1. Field

The present disclosure relates to a sensor actuator and a camera module including the same.

2. Description of the Background

A camera module may be employed in mobile communication terminals such as smartphones, tablet PCs, and laptops.

A camera module may include an actuator having a focus adjustment function and a shake correction function to generate a high-resolution image.

For example, a focus may be adjusted by moving a lens module in the optical axis (Z-axis) direction, or shaking may be corrected by moving the lens module in a direction perpendicular to the optical axis (Z-axis).

However, as performance of a camera module has improved, a weight of the lens module may be increased, and due to weight of the driver for moving the lens module, precise control of driving force of image stabilization may be difficult.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a sensor actuator includes a first movable body on which an image sensor having an imaging plane is disposed, a second movable body spaced apart from the first movable body in a direction perpendicular to the imaging plane; a fixed body accommodating the first movable body and the second movable body, and a driver configured to provide driving force to the first movable body, wherein the first movable body and the second movable body move together in a direction parallel to the imaging plane, and the first movable body rotates relative to the second movable body.

The sensor actuator may further include a first ball member disposed between the fixed body and the second movable body and configured to support the second movable body such that the second movable body moves in first and second directions parallel to the imaging plane.

A first guide groove and a second guide groove for accommodating a first ball member may be disposed on surfaces of the fixed body and the second movable body opposing each other in a direction perpendicular to the imaging plane.

Each of the first guide groove and the second guide groove may have a shape having a length in a direction parallel to the imaging plane, and the first guide groove and the second guide groove may have respective lengths in directions intersecting each other.

The sensor actuator may further include a second ball member disposed between the first movable body and the second movable body and configured to support the first movable body such that the first movable body rotates.

A third guide groove and a fourth guide groove for accommodating the second ball member may be disposed on surfaces of the first movable body and the second movable body opposing each other in a direction perpendicular to the imaging plane, and the second ball member may be in contact with each of the third guide groove and the fourth guide groove at three points.

A center of gravity of the first movable body may overlap the second ball member in a direction perpendicular to the imaging plane.

The sensor actuator may further include a first ball member disposed between the fixed body and the second movable body and configured to support the second movable body such that the second movable body may move in first and second directions parallel to the imaging plane, and a second ball member disposed between the first movable body and the second movable body and configured to support the first movable body such that the first movable body may rotate, wherein a magnetic material may be disposed on each of the first movable body, the second movable body, and the fixed body such that magnetic force may act between the first movable body and the second movable body and between the second movable body and the fixed body.

At least three magnetic bodies may be disposed on each of the first movable body and the second movable body, and the at least three magnetic bodies may form a triangular shape, and wherein a center of the triangular shape and a center of gravity of the first movable body may overlap the second ball member in a direction perpendicular to the imaging plane.

The driver may include a first driver configured to generate driving force in a first axial direction parallel to the imaging plane and a second driver configured to generate driving force in a second axial direction parallel to the imaging plane, wherein the first axial direction and the second axial direction may be perpendicular to each other, wherein the first driver may include a first magnet disposed on one of the first movable body and the fixed body, and a first coil disposed on the other, and wherein the second driver may include a second magnet disposed on one of the first movable body and the fixed body, and a second coil disposed on the other.

The driver may further include a third driver configured to generate driving force in a direction perpendicular to the imaging plane, and wherein the third driver may include a third magnet disposed on one of the first movable body and the fixed body, and a third coil disposed on the other.

The driver may further include a fourth driver configured to generate driving force in a direction parallel to the imaging plane, wherein the fourth driver may include a fourth magnet disposed on one of the first movable body and the fixed body, and a fourth coil disposed on the other, and wherein the fourth magnet and the fourth coil may be disposed such that driving force may act in a position spaced apart from a center of the first movable body.

In another general aspect, a camera module includes a lens module including one or more lenses, a housing accommodating the lens module, a fixed body coupled to the housing, a first movable body and a second movable body accommodated in the fixed body and spaced apart from each other in an optical axis direction, and an image sensor disposed on one surface of the first movable body, wherein the first movable body and the second movable body move together in a direction perpendicular to an optical axis direction, and the first movable body is configured to rotate relative to the second movable body.

The camera module may further include a first ball member disposed between the fixed body and the second movable body and configured to support the second movable body such that the second movable body may move in first and second axial directions perpendicular to the optical axis direction, and a second ball member disposed between the first movable body and the second movable body and configured to support the first movable body such that the first movable body may rotate.

Three or more first ball members may be provided, and one of the second ball members may be provided, and wherein a center of gravity of the first movable body may overlap the second ball member in the optical axis direction.

The camera module may further include a first driver configured to move the first movable body and the second movable body in a first axial direction perpendicular to the optical axis direction, a second driver configured to move the first movable body and the second movable body in a second axial direction perpendicular to the optical axis direction, and a third driver configured to rotate the first movable body relative to the second movable body.

In another general aspect, a sensor actuator includes a first movable body, an image sensor having an imaging plane disposed on the first movable body, and a driver including a first magnet facing a first coil on the first movable body to drive the first movable body in a first direction parallel to the imaging plane, a second magnet facing a second coil on the first movable body to drive the first movable body in a second direction parallel to the imaging plane and crossing the first direction, and one or more of a third magnet facing a third coil on the first movable body to rotate the first movable body about the first direction and/or the second direction, and a fourth magnet facing a fourth coil on the first movable body to rotate the first movable body about a direction perpendicular to the first and second directions.

The sensor actuator may further include a second movable body, wherein the first movable body may be disposed on the second movable body, wherein the second movable body may move in the first and second directions with the first movable body, and wherein the first movable body may rotate about one or more of the first direction and/or the second direction and the direction perpendicular to the first and second directions, relative to the second movable body.

The sensor actuator may further include a first ball member and a second ball member, wherein the second movable member may be disposed on the first ball member, the second ball member may be disposed on the second movable member, and the first movable member may be disposed on the second ball member.

A camera module may include a lens module including one or more lenses, a housing accommodating the lens module, a fixed body coupled to the housing, and the sensor actuator accommodated in the fixed body, wherein light passing through the one or more lenses is incident on the imaging plane.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
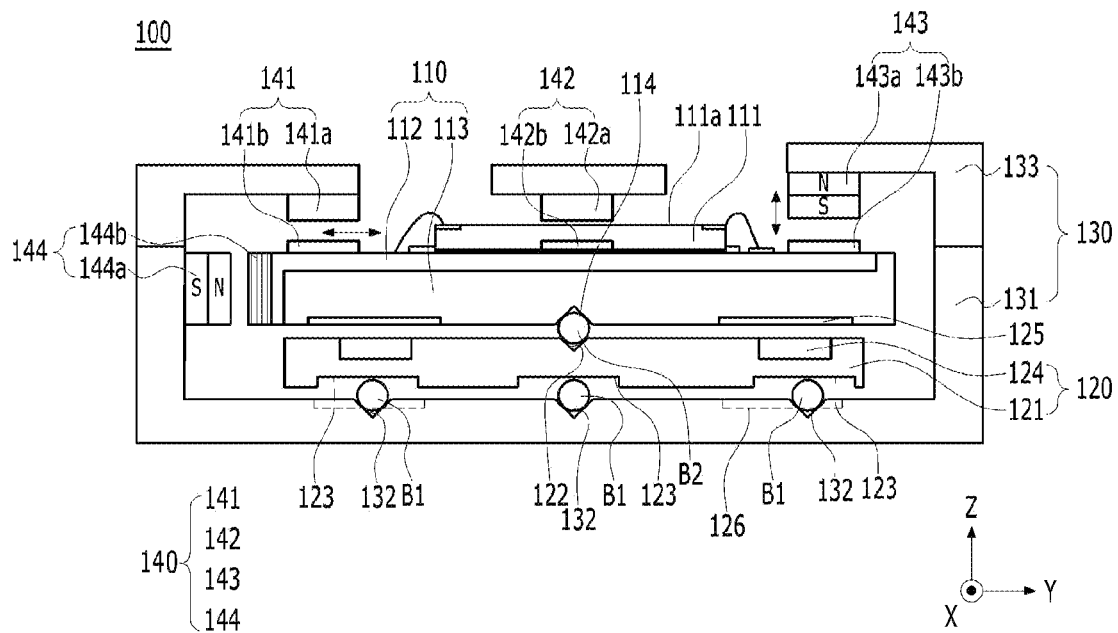
FIG. 1 is a cross-sectional diagram illustrating a sensor actuator according to an example embodiment of the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

One or more example embodiments of the present disclosure may provide a sensor actuator which may improve image stabilization performance and a camera module including the same.

A sensor actuator according to an example embodiment may be one of components of a camera module. Also, the camera module may be mounted on a portable electronic device. A portable electronic device may be implemented as a portable electronic device such as a mobile communication terminal, a smartphone, or a tablet PC.

FIG. 1 is a cross-sectional diagram illustrating a sensor actuator according to an example embodiment.

Referring to FIG. 1, the sensor actuator 100 may include a first movable body 110, a second movable body 120, a fixed body 130, and a driver 140.

An image sensor 111 may be disposed on the first movable body 110, and the first movable body 110 may be disposed to move relative to the fixed body 130.

The first movable body 110 may be configured to move together with the image sensor 111. For example, the first movable body 110 may include a sensor substrate 112 on which the image sensor 111 is mounted and a sensor plate 113 coupled to the sensor substrate 112.

The image sensor 111 may be disposed on one surface of the sensor substrate 112, and the other surface of the sensor substrate 112 may be coupled to the sensor plate 113. Also, the sensor substrate 112 may be connected to a connector 160 for transmitting a signal of the image sensor 111 to an external device. For example, the sensor substrate 112 and the connector 160 may be electrically connected by a flexible substrate 150. A plurality of bridges 151 flexibly bent according to movement of the image sensor 111 may be disposed on the flexible substrate 150 (see FIG. 8).

A signal of the image sensor 111 may be transmitted to other electronic components through the sensor substrate 112, the flexible substrate 150, and the connector 160.

The fixed body 130 may include a first housing 131 and a second housing 133, and may further include components fixed and coupled to the first housing 131 and the second housing 133. For example, the fixed body 130 may include a first magnet 141a, a second magnet, a third magnet, and a fourth magnet to be described later.

The first housing 131 and the second housing 133 may be coupled to each other, and the first movable body 110 and the second movable body 120 may be accommodated in an internal space provided by the coupling between the first housing 131 and the second housing 133.

The driver 140 may move the image sensor 111, the first movable body 110, and the second movable body 120.

The first movable body 110 may move, through the driver 140, in a direction perpendicular to a direction in which an imaging plane 111a of the image sensor 111 is oriented. In an example embodiment, the driver 140 may compensate for shaking occurring when a camera module 10, 20 on which the image sensor 111 is mounted images (see FIGS. 10 and 11).

The driver 140 may move the first movable body 110 on which the image sensor 111 is mounted in a first axial direction (X-axis direction) and a second axial direction (Y-axis direction) perpendicular to the optical axis (Z-axis). The first axial direction (X-direction) and the second axial direction (Y-direction) may intersect each other. For example, the driver 140 may move the first movable body 110 in a first axial direction (X-axis direction) and/or a second axial direction (Y-axis direction) perpendicular to the optical axis (Z-axis), and accordingly, the shake may be corrected.

In the example embodiment, the direction in which the imaging plane 111a of the image sensor 111 is oriented may be referred to as an optical axis (Z-axis) direction. That is, the first movable body 110 may move in a direction perpendicular to the optical axis (Z-axis) with respect to the fixed body 130.

In the drawings, the configuration in which the first movable body 110 may move in a direction parallel to the imaging plane 111a may indicate that the first movable body 110 may move in a direction perpendicular to the optical axis (Z-axis).

Also, the first axial direction (X-axis direction) and the second axial direction (Y-axis direction) are examples of two directions perpendicular to the optical axis (Z-axis) and intersecting each other, and in the example embodiment, the first axial direction (The X-axis direction) and the second axial direction (Y-axis direction) may be understood as two directions perpendicular to the optical axis (Z-axis) and intersecting each other.

In an example embodiment, the driver 140 may rotate the first movable body 110 on which the image sensor 111 is mounted. For example, the first movable body 110 may rotate about the first axial direction (X-axis direction) and/or about the second axial direction (Y-axis direction) as rotation axes. Also, the first movable body 110 may rotate about the optical axis (Z-axis) as a rotation axis.

The sensor actuator 100 may include a second movable body 120 disposed between the first movable body 110 and the fixed body 130. The second movable body 120 may include a guide plate 121 and a component (e.g., a first magnetic body 124) fixed and coupled to the guide plate 121.

The first movable body 110 and the second movable body 120 may be configured to move together in a direction perpendicular to the optical axis (Z-axis). For example, the first movable body 110 and the second movable body 120 may move together in the first axial direction (X-axis direction) and/or in the second axial direction (Y-axis direction).

In an example embodiment, a first ball member B1 may be disposed between the fixed body 130 and the second movable body 120.

A first guide groove 132 and a second guide groove 123 for accommodating at least a portion of the first ball member B1 may be provided in the fixed body 130 and the second movable body 120, respectively. For example, the first guide groove 132 and the second guide groove 123 may be formed on surfaces on which the fixed body 130 and the second movable body 120 oppose each other in the optical axis (Z-axis) direction.

The first ball member B1 may be disposed between the first guide groove 132 of the fixed body 130 and the second guide groove 123 of the second movable body 120. Accordingly, when the second movable body 120 moves within the fixed body 130, the second movable body 120 may be guided by the first ball member B1 such that the first movable body 110 may move smoothly.

Figure 3:
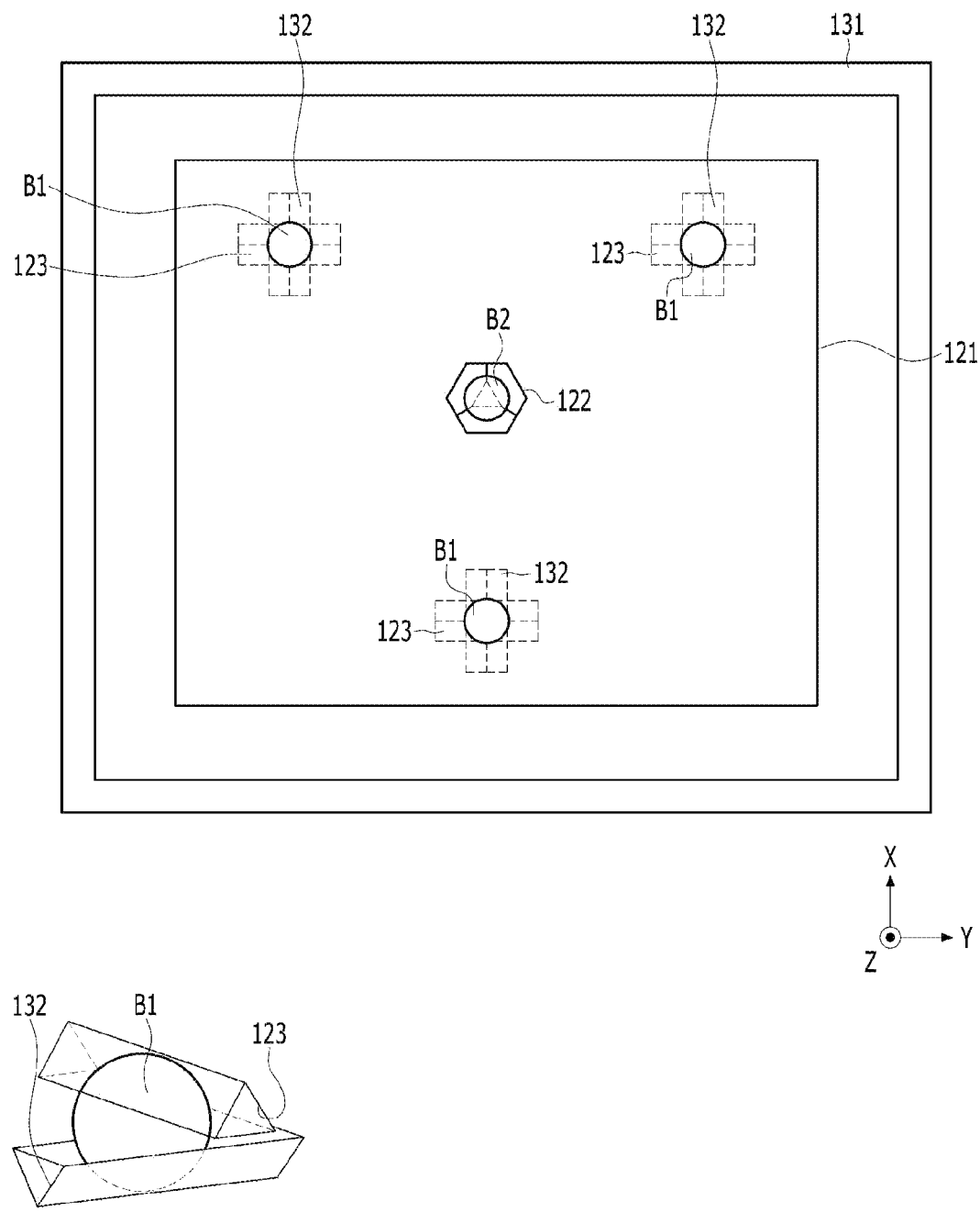
FIG. 3 is a plan diagram illustrating a first housing and a first movable body according to an example embodiment of the present disclosure.

The first guide groove 132 and the second guide groove 123 may have a shape having a length in a direction intersecting each other (see FIG. 3). For example, the first guide groove 132 may extend in a direction parallel to the imaging plane 111a of the image sensor 111, and the second guide groove 123 may also extend in a direction parallel to the imaging plane 111a of the image sensor 111. Here, the direction in which the first guide groove 132 extends and the direction in which the second guide groove 123 extends may intersect each other.

In an example embodiment, the first guide groove 132 may have a length in the first axial direction (X-axis direction) and the second guide groove 123 may have a length in the second axial direction (Y-axis direction). The first axial direction (X-axis direction) and the second axial direction (Y-axis direction) may be perpendicular to each other on a plane parallel to the imaging plane 111a of the image sensor 111.

Accordingly, the second movable body 120 may move in the first axial direction (X-axis direction) and the second axial direction (Y-axis direction) with respect to the fixed body 130.

When the driving force is generated in the first axial direction (X-axis direction), both the first movable body 110 and the second movable body 120 may move relative to the fixed body 130 in the first axial direction (X-axis direction). Also, when the driving force is generated in the second axial direction (Y-axis direction), both the first movable body 110 and the second movable body 120 may move relative to the fixed body 130 in the second axial direction (Y-axis direction).

In another example embodiment, both the first guide groove 132 and the second guide groove 123 may have a shape not limiting the rolling direction of the first ball member B1. For example, the first guide groove 132 and the second guide groove 123 may have a polygonal shape or a circular shape having a size larger than a diameter of the first ball member B1.

In another example embodiment, the first guide groove 132 may have a shape in contact with the first ball member B1 at three points such that the first ball member B1 may rotates in the same place, and the second guide groove 123 may have a polygonal shape or a circular shape having a size larger than the diameter of the first ball member B1.

The first ball member B1 may include at least three balls, and the first guide groove 132 and the second guide groove 123 may include guide grooves of which the number corresponds to the number of balls included in the first ball member B1.

For example, referring to FIG. 3, three first ball members B1 may be provided, and three first ball members B1 may be disposed in a triangular shape.

Figure 5:
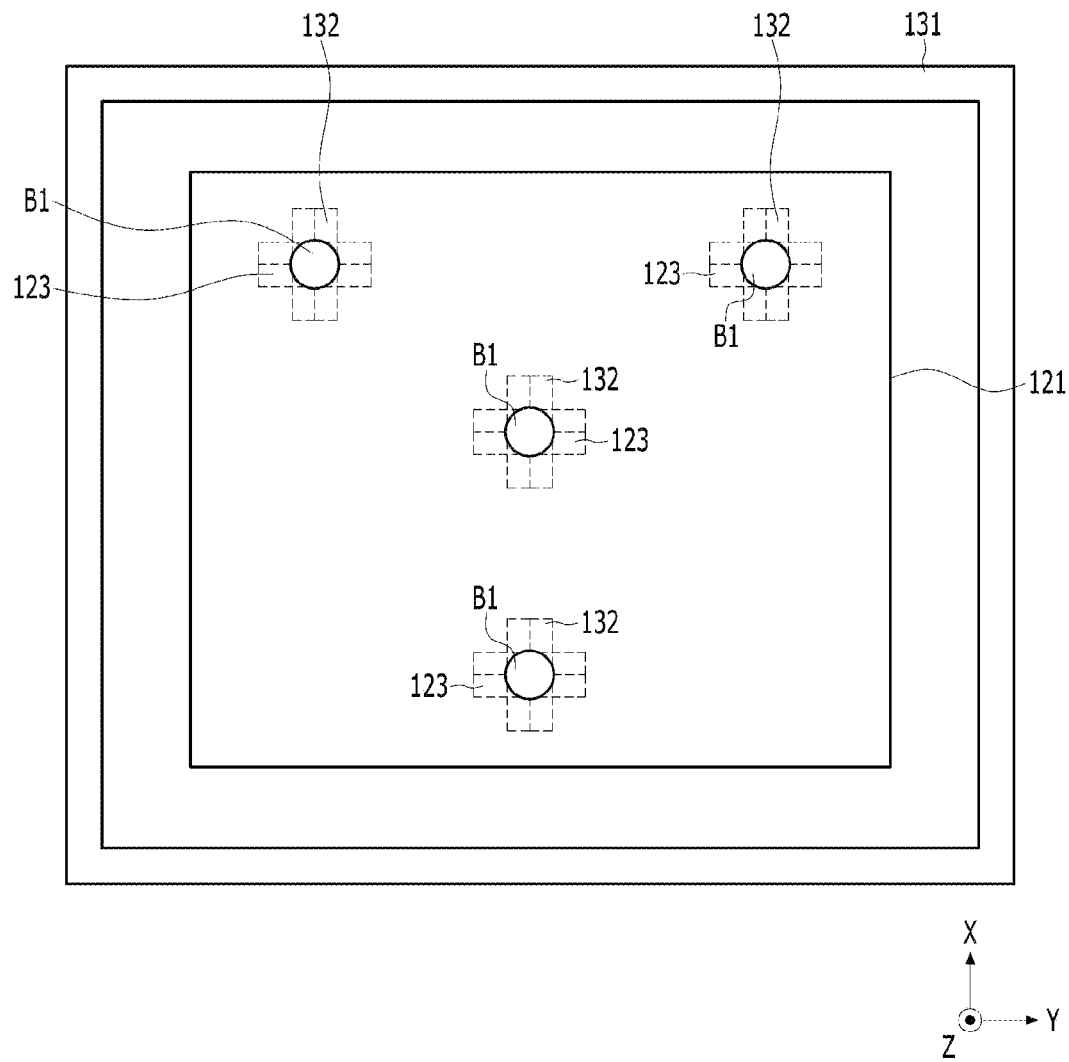
FIG. 5 is a diagram illustrating a modified example of FIG. 3.

Alternatively, referring to FIG. 5, four first ball members B1 may be provided. In this case, the three first ball members B1 may be disposed in a triangular shape, and one of the ball members may be disposed in the center of the triangle. A second ball member B2 is not illustrated in FIG. 5 for ease of description, and a first ball member B1 may be disposed on a lower surface of the guide plate 121, and a second ball member B2 may be disposed on an upper surface of the guide plate 121.

The first ball member B1, the first guide groove 132 and the second guide groove 123 may guide the movement of the second movable body 120 such that the second movable body 120 may perform translation movement on the X-Y plane.

Referring to FIG. 1, a second ball member B2 may be disposed between the first movable body 110 and the second movable body 120.

The first movable body 110 and the second movable body 120 may include a third guide groove 114 and a fourth guide groove 122 for accommodating at least a portion of the second ball member B2, respectively. For example, the third guide groove 114 and the fourth guide groove 122 may be formed on surfaces on which the first movable body 110 and the second movable body 120 oppose each other in the optical axis (Z-axis) direction.

The second ball member B2 may be disposed between the third guide groove 114 of the first movable body 110 and the fourth guide groove 122 of the second movable body 120.

The second ball member B2 may include a ball, and may be disposed such that the optical axis (Z-axis) or the center line (a virtual line passing through the center of the imaging plane 111a and extending parallel to the optical axis (Z-axis)) of the imaging plane 111a may pass through the second ball member B2.

In an example embodiment, the center of gravity of the first movable body 110 and the second ball member B2 may overlap in the optical axis (Z-axis) direction.

The second ball member B2 may be in contact with the third guide groove 114 at three points, and may be in contact with the fourth guide groove 122 at three points. Accordingly, the position of the second ball member B2 may be fixed between the third guide groove 114 and the fourth guide groove 122 (see FIG. 3).

Accordingly, when the first movable body 110 rotates relative to the second movable body 120, the second ball member B2 may form a rotation axis.

The first movable body 110 may rotate, relative to the second movable body 120 about the first axial direction (X-axis direction) and/or about the second axial direction (Y-axis direction) as rotation axes. Also, the first movable body 110 may rotate, relative to the second movable body 120 about the optical axis (Z-axis) as a rotation axis.

Figure 2:
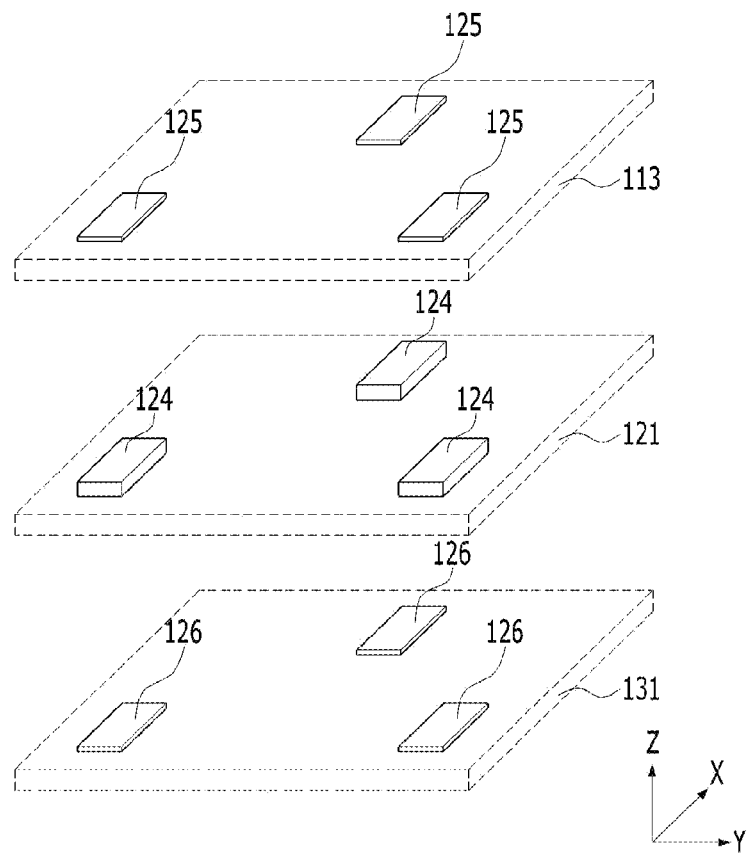
FIG. 2 is a diagram illustrating a pulling device according to an example embodiment of the present disclosure.

FIG. 2 is a diagram illustrating a pulling device according to an example embodiment.

Since the first movable body 110 is supported to rotate with respect to the second movable body 120, it may be necessary to determine the position (hereinafter, an initial position) of the first movable body 110 when driving force of the driver 140 does not act. Also, the first movable body 110 and the second movable body 120 may need to be in contact and maintain contact with the second ball member B2.

Also, the second movable body 120 and the fixed body 130 may need to be in contact and maintain contact with the first ball member B1.

To this end, the sensor actuator 100 may include a pulling device.

Referring to FIG. 2, the pulling device may include a first magnetic body 124 and second magnetic bodies 125 and 126 disposed to oppose each other in the optical axis (Z-axis) direction. Magnetic attraction force may act between the first magnetic body 124 and the second magnetic bodies 125 and 126. For example, the first magnetic body 124 may be a permanent magnet, and the second magnetic bodies 125 and 126 may be yokes. As another example, both the first magnetic body 124 and the second magnetic bodies 125 and 126 may be permanent magnets.

In an example embodiment, the first magnetic body 124, which is a permanent magnet, may be disposed in the second movable body 120 disposed between the first movable body 110 and the fixed body 130. Also, the second magnetic bodies 125 and 126 may be disposed on the first movable body 110 and the fixed body 130, in positions opposing the first magnetic body 124 in the optical axis (Z-axis) direction, respectively.

The first movable body 110 and the fixed body 130 may be pulled toward the second movable body 120 by magnetic force created between the first magnetic body 124 and the second magnetic bodies 125 and 126, and accordingly, the fixed body 130 and the second movable body 120 may be in close contact with the first ball member B1, and the first movable body 110 and the second movable body 120 may be in close contact with the second ball member B2.

When the magnetic force created between the first magnetic body 124 and the second magnetic bodies 125 and 126 is concentrated on one side, the first movable body 110 may be inclined with respect to the second movable body 120. Accordingly, at least three of the first magnetic body 124 and at least three of the respective second magnetic bodies 125 and 126 may be provided such that at least three pairs of magnetic forces may act.

When three first magnetic bodies 124 and three second magnetic bodies 125 and 126 are provided, the three first magnetic bodies 124 may be disposed in a triangular shape, and the three second magnetic bodies 125 and 126 may also be disposed in a triangular shape to correspond thereto.

Also, the center of the triangle and the center of gravity of the first movable body 110 may overlap the second ball member B2 and the optical axis (Z-axis) in a direction.

In an example embodiment, the center of the triangle, the center of the second ball member B2, and the center of gravity of the first movable body 110 may overlap in the optical axis (Z-axis) direction.

Referring back to FIG. 1, in an example embodiment, the driver 140 may include a first driver 141, a second driver 142, a third driver 143, and a fourth driver 144.

The first driver 141 may generate driving force in a first axial direction, the second driver 142 may generate driving force in a second axial direction, the third driver 143 may generate driving force in the optical axis direction, and the fourth driver 144 may generate driving force in the first axial direction or the second axial direction.

The first driver 141 may include a first magnet 141a coupled to one of the first movable body 110 and the fixed body 130 and a first coil 141b coupled to the other. The first magnet 141a and the first coil 141b may be disposed to oppose each other in the optical axis (Z-axis) direction. In FIG. 1, the first magnet 141a may be coupled to the second housing 133 and the first coil 141b may be coupled to the first movable body 110, but the positions of the first magnet 141a and the first coil 141b may be interchanged.

One surface of the first magnet 141a may be magnetized such that an N-pole and an S-pole may be disposed in the first axial direction. That is, one surface of the first magnet 141a opposing the first coil 141b may have an N-pole and an S-pole, and a neutral region between the N-pole and the S-pole may be formed in the second axial direction.

Figure 4A:
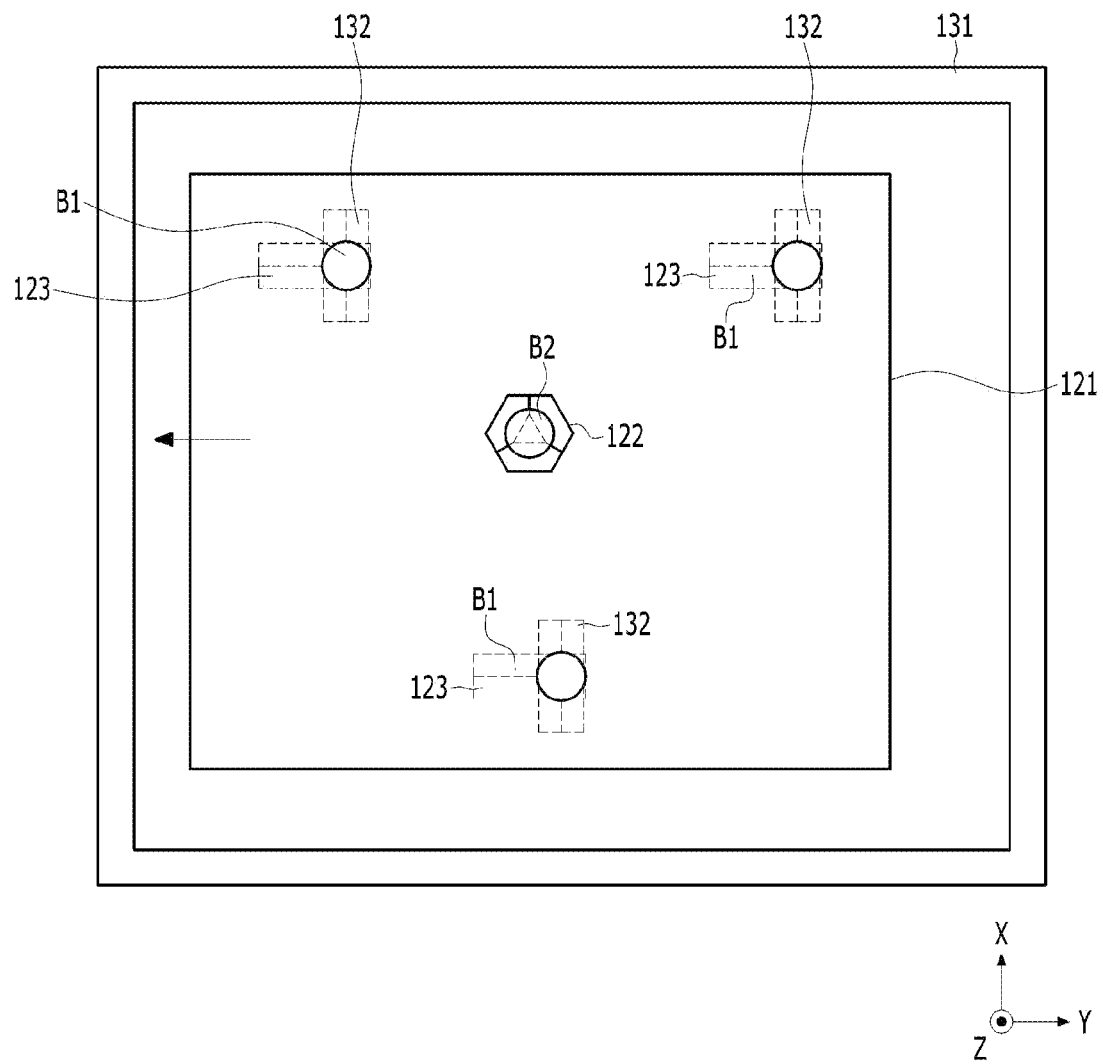
FIGS. 4A, 4B, 4C, and 4D are diagrams illustrating an example in which a first movable body moves.
Figure 4B:
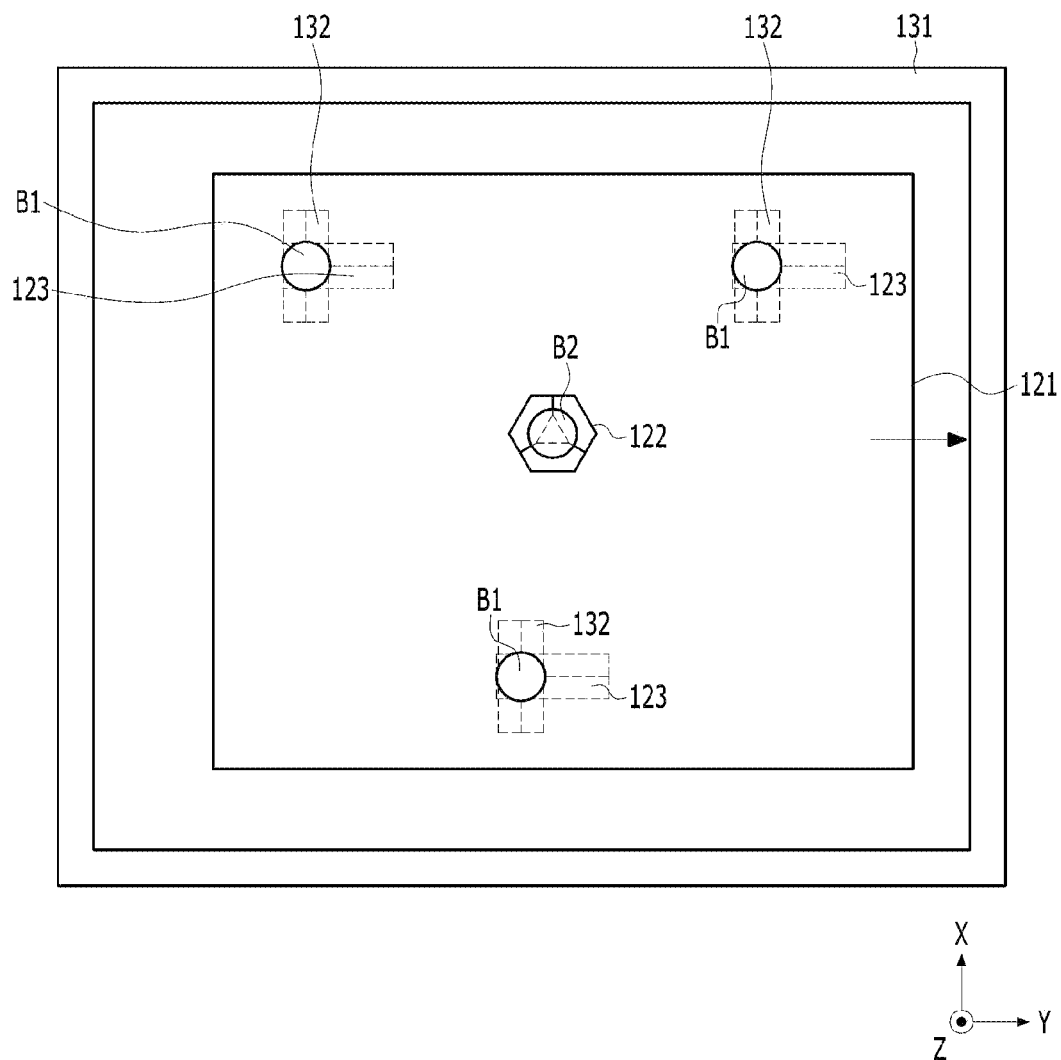

Driving force may be created in the first axial direction by electromagnetic force between the first magnet 141a and the first coil 141b, and accordingly, both the first movable body 110 and the second movable body 120 may move in the first axial direction (see FIGS. 4A and 4B).

The second driver 142 may include a second magnet 142a coupled to one of the first movable body 110 and the fixed body 130 and a second coil 142b coupled to the other. The second magnet 142a and the second coil 142b may be disposed to oppose each other in the optical axis (Z-axis) direction. In FIG. 1, the second magnet 142a may be coupled to the second housing 133 and the second coil 142b may be coupled to the first movable body 110, but the positions of the second magnet 142a and the second the coils 142b may be interchanged.

One surface of the second magnet 142a may be magnetized such that an N-pole and an S-pole may be disposed in the second axial direction. That is, one surface of the second magnet 142a opposing the second coil 142b may have an N-pole and an S-pole, and a neutral region between the N-pole and the S-pole may be formed in the first axial direction.

Figure 4C:
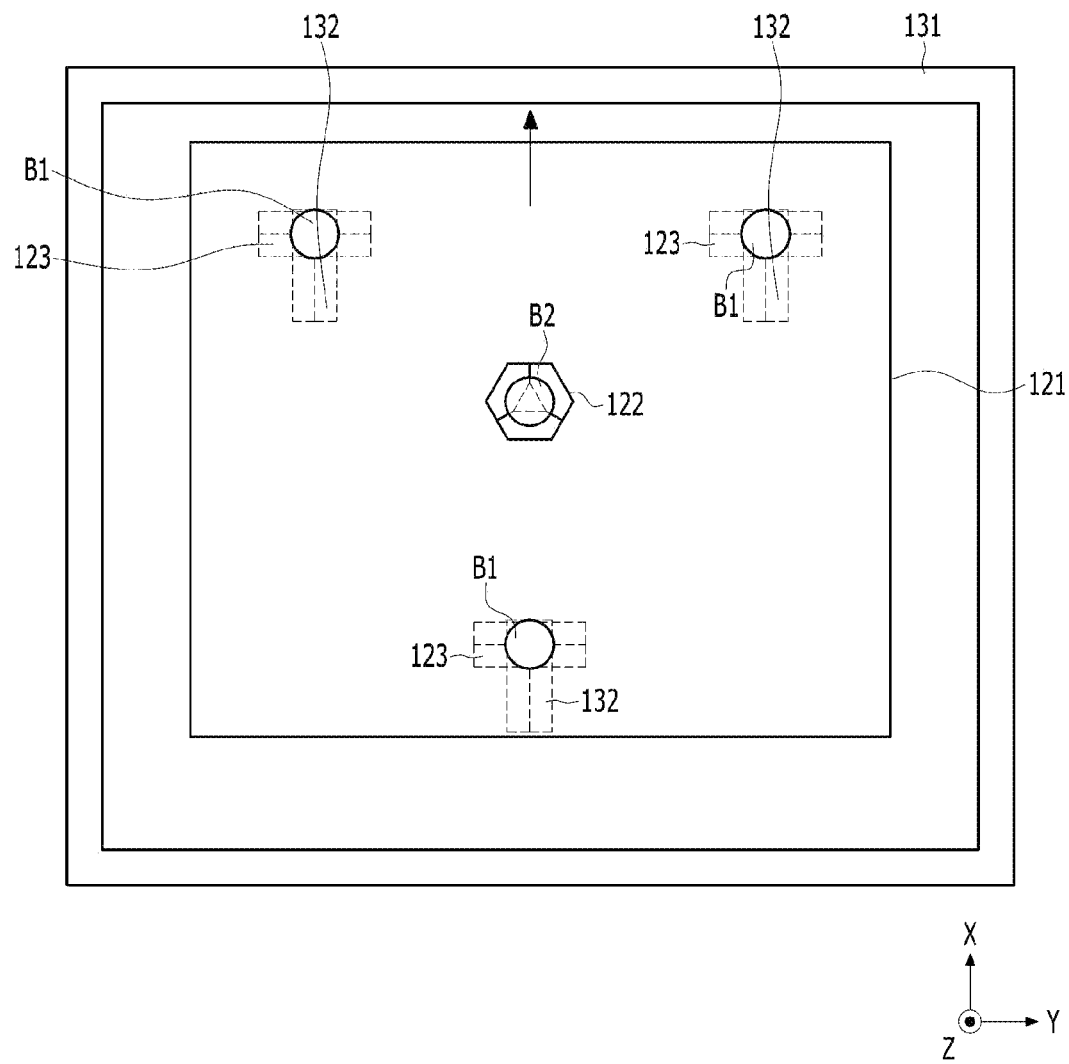
Figure 4D:
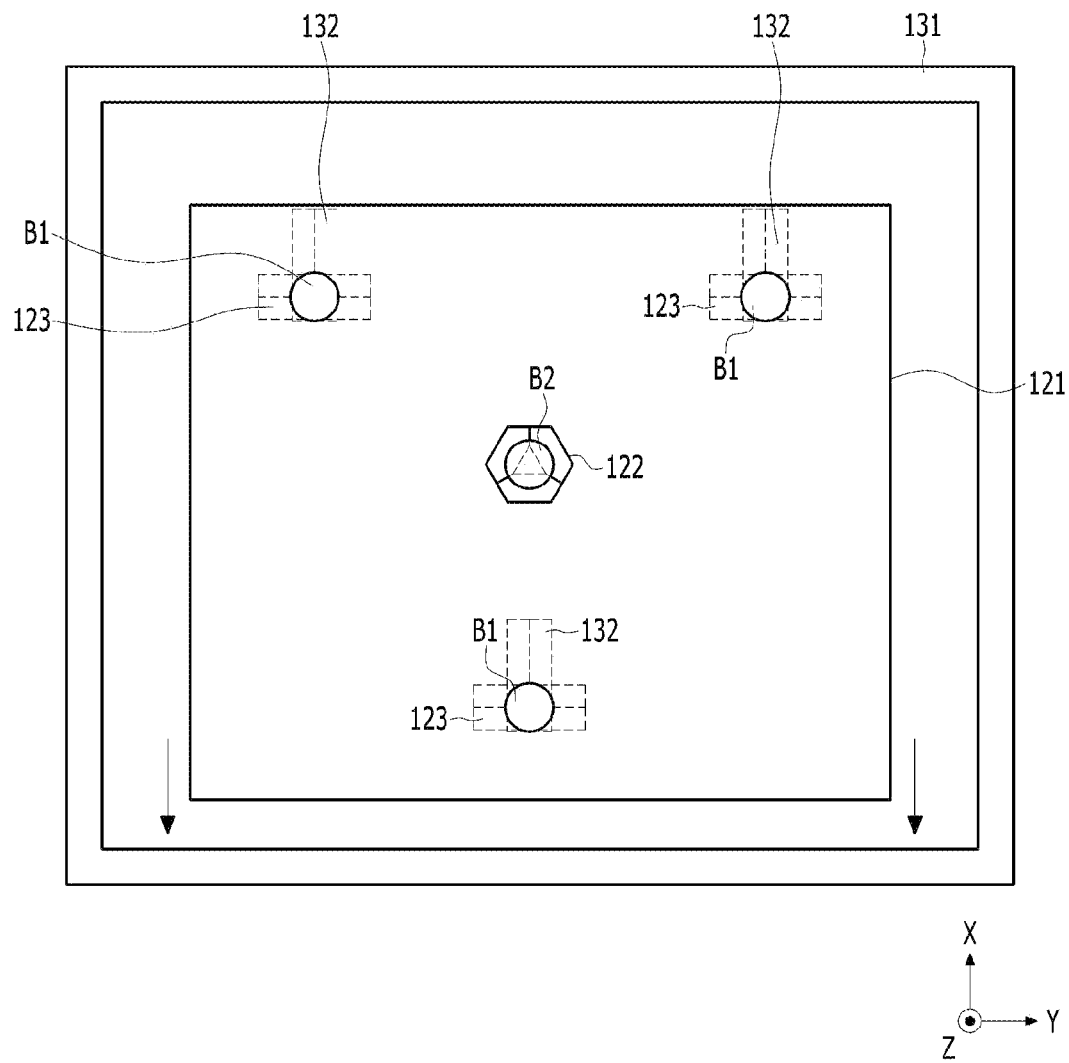

Driving force may be created in the second axial direction by electromagnetic force between the second magnet 142a and the second coil 142b, and accordingly, both the first movable body 110 and the second movable body 120 may move in the second axial direction (see FIGS. 4C and 4D).

The third driver 143 may include a third magnet 143a coupled to one of the first movable body 110 and the fixed body 130 and a third coil 143b coupled to the other. The third magnet 143a and the third coil 143b may be disposed to oppose each other in the optical axis (Z-axis) direction. In FIG. 1, the third magnet 143a may be coupled to the second housing 133 and the third coil 143b may be coupled to the first movable body 110, but the positions of the third magnet 143a and the third coil 143b may be interchanged.

One surface of the third magnet 143a may be magnetized to have an N-pole or an S-pole. That is, one surface of the first magnet 143a opposing the third coil 143b may have an N-pole or an S-pole.

Figure 6:
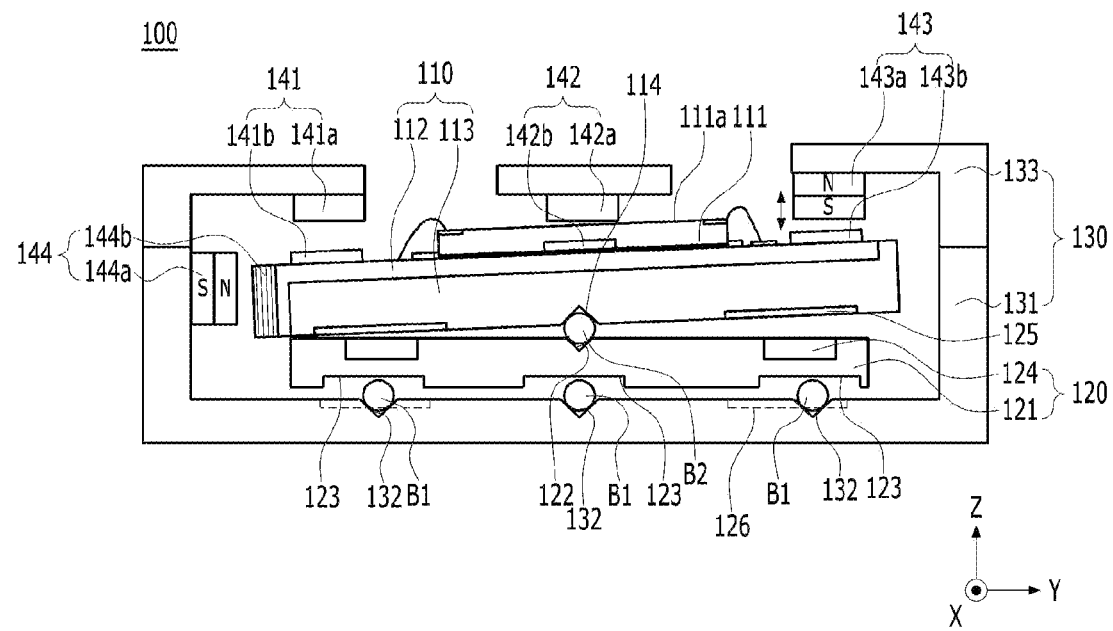
FIG. 6 is a cross-sectional diagram illustrating an example in which a first movable body rotates.

Driving force may be created in the optical axis direction by electromagnetic force between the third magnet 143a and the third coil 143b, and accordingly, the first movable body 110 may rotate about the first axis with respect to the second movable body 120 (see FIG. 6). The first movable body 110 may rotate about the second axis as a rotation axis according to the position or arrangement form of the third driver 143.

In an example embodiment, the third driver 143 may include two third magnets 143a and two third coils 143b spaced apart from each other to rotate the first movable body 110 about the first axis with respect to the second movable body 120 and rotate the first movable body 110 about the second axis with respect to the second movable body 120.

The fourth driver 144 may include a fourth magnet 144a coupled to one of the first movable body 110 and the fixed body 130 and a fourth coil 144b coupled to the other. The fourth magnet 144a and the fourth coil 144b may be disposed to oppose each other in a direction perpendicular to the optical axis (Z-axis). In FIG. 1, the fourth magnet 144a may be coupled to the first housing 131 and the fourth coil 144b may be coupled to the first movable body 110, but the position of the fourth magnet 144a and the fourth coil 144b may be interchanged.

The fourth magnet 144a may be disposed on the internal side surface of the first housing 131, and the fourth coil 144b may be disposed on the side surface of the first movable body 110. In FIG. 1, the fourth magnet 144a and the fourth coil 144b may be disposed to oppose each other in the second axial direction, but the fourth magnet 144a and the fourth coil 144b may also be disposed to oppose each other in the first axial direction.

Also, the fourth magnet 144a may be spaced apart from the center of the internal side surface of the first housing 131, and the fourth coil 144b may also be spaced apart from the center of the side surface of the first movable body 110, which may be to rotate the first movable body 110 by driving force of the fourth driver 144.

Figure 7:
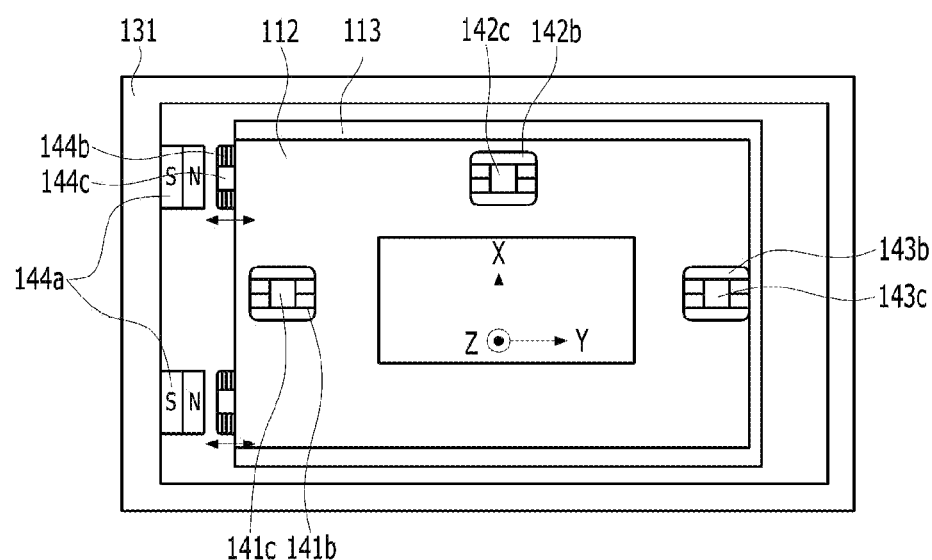
FIGS. 7, 8, and 9 are diagrams illustrating a fourth driver according to an example embodiment of the present disclosure.
Figure 8:
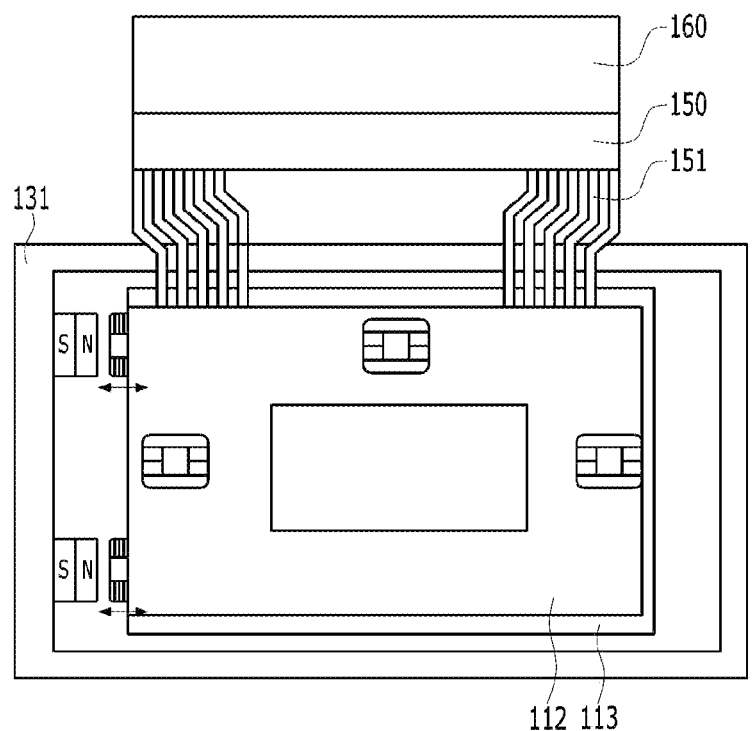

In an example embodiment, the fourth driver 144 may include two fourth magnets 144a and two fourth coils 144b spaced apart from each other in the first axial direction (FIGS. 7 and 8).

Figure 9:
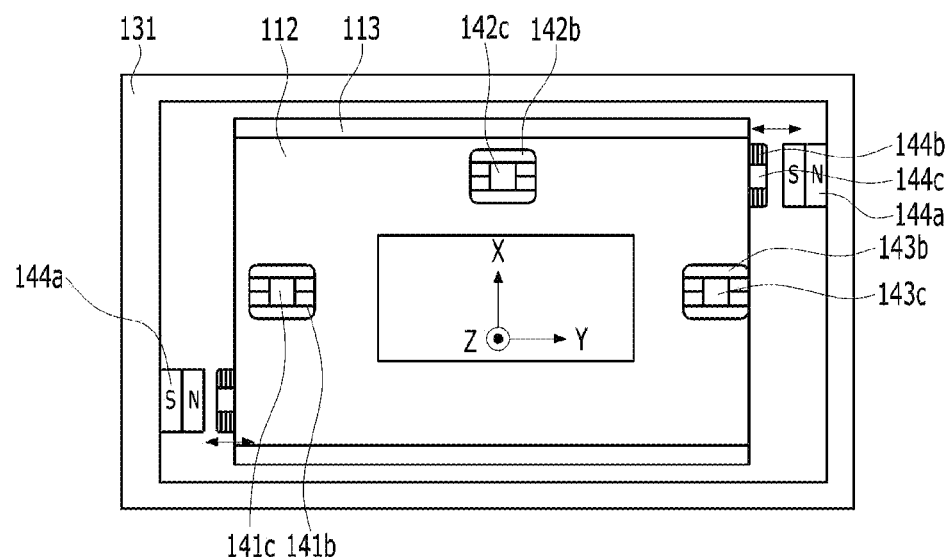

In an example embodiment, the fourth driver 144 may include two fourth magnets 144a and two fourth coils 144b spaced apart from each other in a diagonal direction of the image sensor 111 (see FIG. 9).

One surface of the fourth magnet 144a may be magnetized to have an N-pole or an S-pole. That is, one surface of the fourth magnet 144a opposing the fourth coil 144b may have an N-pole or an S-pole.

Driving force may be created in the second axial direction by electromagnetic force between the fourth magnet 144a and the fourth coil 144b. Since the fourth magnet 144a and the fourth coil 144b may be spaced apart from the center of the internal side surface of the first housing 131 and the center of the side surface of the first movable body 110, respectively, the first movable body 110 may rotate about an optical axis as a rotation axis by driving force created between the fourth magnet 144a and the fourth coil 144b (see FIGS. 7 to 9).

Each of the first driver 141 to the fourth driver 144 may include a position sensor to sense the position of the first movable body 110. For example, the first driver 141 may include a first position sensor 141c disposed to oppose the first magnet 141a, the second driver 142 may include a second position sensor 142c disposed to oppose the second magnet 142a, the third driver 143 may include a third position sensor 143c disposed to oppose the third magnet 143a, and the fourth driver 144 may include a fourth position sensor 144c disposed to oppose the fourth magnet 144a. Each position sensor may be a Hall sensor.

Figure 10:
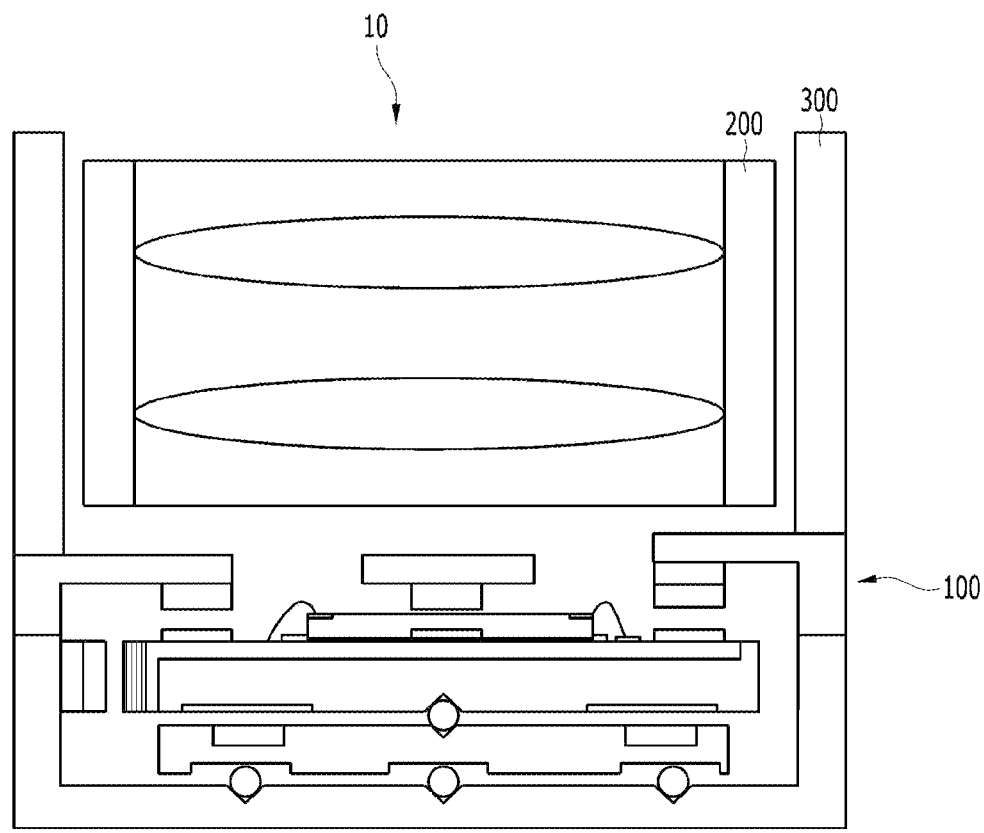
FIG. 10 is a cross-sectional diagram illustrating a camera module according to an example embodiment of the present disclosure.

FIG. 10 is a cross-sectional diagram illustrating a camera module according to an example embodiment.

Referring to FIG. 10, the camera module 10 in an example embodiment may include a lens module 200, a housing 300 accommodating the lens module 200, and a sensor actuator 100.

At least one lens for imaging a subject may be accommodated in the lens module 200. When one lens or a plurality of lenses of the at least one lens are disposed, the one lens or the plurality of lenses of the at least one lens may be provided in the lens module 200 along the optical axis (Z-axis).

The lens module 200 may have a hollow cylindrical shape.

In another example embodiment, the lens module 200 may include a lens barrel and a lens holder. In this case, at least one lens may be accommodated in the lens barrel, and the lens barrel may be coupled to the lens holder.

The housing 300 may accommodate the lens module 200, and the housing 300 may be coupled to the sensor actuator 100.

The sensor actuator 100 may be the sensor actuator 100 in an example embodiment described above.

An image sensor 111 may be disposed on the sensor actuator 100, and the image sensor 111 may move in the first axial direction (X-axis direction) and the second axial direction (Y-axis direction) by the driver 140, may rotate about the first axis and/or the second axis as a rotation axis, and may rotate about the optical axis (Z-axis) as a rotation axis.

Accordingly, the optical image stabilization function may be performed by the movement of the image sensor 111.

The camera module 10 in an example embodiment may perform shaking correction by moving the image sensor 111, rather than the lens module 200. Since the image sensor 111 having a relatively light weight moves, the image sensor 111 may move with smaller driving force. Accordingly, the camera module may have a reduced size.

In an example embodiment, the lens module 200 may move in the optical axis direction with respect to the housing 300. Accordingly, a focus adjustment function may be performed by movement of the lens module 200. The driver for moving the lens module 200 may include a magnet and a coil.

Figure 11:
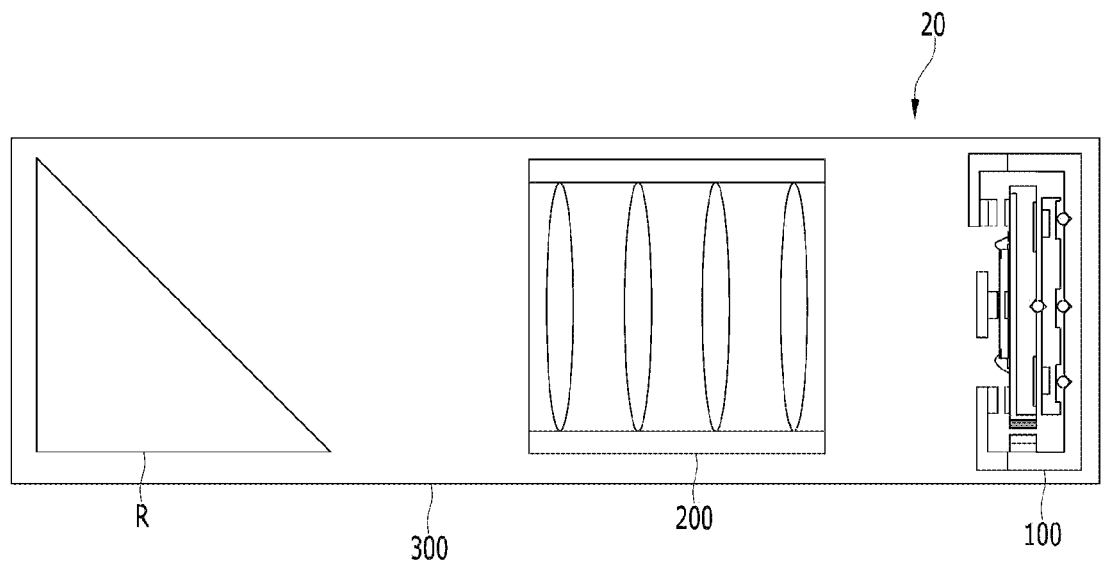
FIG. 11 is a cross-sectional diagram illustrating a camera module according to another example embodiment of the present disclosure.

FIG. 11 is a cross-sectional diagram illustrating a camera module according to another example embodiment.

Referring to FIG. 11, the camera module 20 in another example embodiment may include a housing 300, a reflective member R, a lens module 200 and a sensor shifting actuator 100.

In the example embodiment, the optical axis (Z-axis) of the lens module 200 may be directed in a direction perpendicular to the thickness direction (a direction from the front surface to the rear surface of the portable electronic device or an opposite direction thereof) of the portable electronic device.

For example, the optical axis (Z-axis) of the lens module 200 may be formed in the width direction or the length direction of the portable electronic device.

When the components included in the camera module are stacked in the thickness direction of the portable electronic device, the thickness of the portable electronic device may increase, which may be problematic.

However, in the camera module of the example embodiment, since the optical axis (Z-axis) of the lens module 200 is formed in the width direction or the length direction of the portable electronic device, the thickness of the portable electronic device may be reduced.

The reflective member R and the lens module 200 may be disposed in the housing 300. However, the reflective member R and the lens module 200 may be disposed in different housings, and the housings may be coupled to each other.

The reflective member R may be configured to change a traveling direction of light. For example, the traveling direction of light incident into the housing 300 may be changed to be directed toward the lens module 200 through the reflective member R. The reflective member R may be a mirror or a prism that reflects light.

The sensor actuator 100 may be coupled to the housing 300.

The sensor actuator 100 may be the sensor actuator 100 according to an example embodiment described above.

An image sensor 111 may be disposed on the sensor actuator 100, the image sensor 111 may move in the first axial direction (X-axis direction) and the second axial direction (Y-axis direction) by the driver 140, may rotate about the first axis and/or the second axis as a rotation axis, and may rotate about the optical axis (Z-axis) as a rotation axis.

Accordingly, the optical image stabilization function may be performed by the movement of the image sensor 111.

According to the aforementioned example embodiments, a sensor actuator and a camera module including the same may improve optical image stabilization performance.

The sensor actuator 100, image sensor 111, driver for moving the lens module, driver 140, first driver 141, second driver 142, third driver 143, fourth driver 144, first position sensor 141c, second position sensor 142c, third position sensor 143c, fourth position sensor 144c, sensor and other apparatuses, devices, units, modules, and components described herein with respect to FIGS. 1-11 are implemented by or representative of hardware components. Examples of hardware components that may be used to perform the operations described herein where appropriate include controllers, sensors, generators, drivers, memories, comparators, arithmetic logic units, adders, subtractors, multipliers, dividers, integrators, and any other electronic components configured to perform the operations described herein. In other examples, one or more of the hardware components that perform the operations described herein are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described herein. The hardware components may also access, manipulate, process, create, and store data in response to execution of the instructions or software. For simplicity, the singular term "processor" or "computer" may be used in the description of the examples described herein, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described herein are performed by computing hardware, for example, by one or more processors or computers, implemented as described above executing instructions or software to perform the operations described herein that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A sensor actuator, comprising:
   a first movable body on which an image sensor having an imaging plane is disposed;
   a second movable body spaced apart from the first movable body in a direction perpendicular to the imaging plane;
   a fixed body accommodating the first movable body and the second movable body; and
   a driver configured to provide driving force to the first movable body,
   wherein the first movable body and the second movable body move together in a direction parallel to the imaging plane, and the first movable body rotates relative to the second movable body.

2. The sensor actuator of claim 1, further comprising:
   a first ball member disposed between the fixed body and the second movable body and configured to support the second movable body such that the second movable body moves in first and second directions parallel to the imaging plane.

3. The sensor actuator of claim 2, wherein a first guide groove and a second guide groove for accommodating a first ball member are disposed on surfaces of the fixed body and the second movable body opposing each other in a direction perpendicular to the imaging plane.

4. The sensor actuator of claim 3,
   wherein each of the first guide groove and the second guide groove have a shape having a length in a direction parallel to the imaging plane, and
   wherein the first guide groove and the second guide groove have respective lengths in directions intersecting each other.

5. The sensor actuator of claim 1, further comprising:
   a second ball member disposed between the first movable body and the second movable body and configured to support the first movable body such that the first movable body rotates.

6. The sensor actuator of claim 5, wherein a third guide groove and a fourth guide groove for accommodating the second ball member are disposed on surfaces of the first movable body and the second movable body opposing each other in a direction perpendicular to the imaging plane, and the second ball member is in contact with each of the third guide groove and the fourth guide groove at three points.

7. The sensor actuator of claim 5, wherein a center of gravity of the first movable body overlaps the second ball member in a direction perpendicular to the imaging plane.

8. The sensor actuator of claim 1, further comprising:
   a first ball member disposed between the fixed body and the second movable body and configured to support the second movable body such that the second movable body moves in first and second directions parallel to the imaging plane; and
   a second ball member disposed between the first movable body and the second movable body and configured to support the first movable body such that the first movable body rotates,
   wherein a magnetic material is disposed on each of the first movable body, the second movable body, and the fixed body such that magnetic force acts between the first movable body and the second movable body and between the second movable body and the fixed body.

9. The sensor actuator of claim 8,
   wherein at least three magnetic bodies are disposed on each of the first movable body and the second movable body, and the at least three magnetic bodies form a triangular shape, and
   wherein a center of the triangular shape and a center of gravity of the first movable body overlap the second ball member in a direction perpendicular to the imaging plane.

10. The sensor actuator of claim 1,
    wherein the driver comprises a first driver configured to generate driving force in a first axial direction parallel to the imaging plane and a second driver configured to generate driving force in a second axial direction parallel to the imaging plane, wherein the first axial direction and the second axial direction are perpendicular to each other, wherein the first driver comprises a first magnet disposed on one of the first movable body and the fixed body, and a first coil disposed on the other, and wherein the second driver comprises a second magnet disposed on one of the first movable body and the fixed body, and a second coil disposed on the other.

11. The sensor actuator of claim 10, wherein the driver further comprises a third driver configured to generate driving force in a direction perpendicular to the imaging plane, and wherein the third driver comprises a third magnet disposed on one of the first movable body and the fixed body, and a third coil disposed on the other.

12. The sensor actuator of claim 10, wherein the driver further comprises a fourth driver configured to generate driving force in a direction parallel to the imaging plane, wherein the fourth driver comprises a fourth magnet disposed on one of the first movable body and the fixed body, and a fourth coil disposed on the other, and wherein the fourth magnet and the fourth coil are disposed such that driving force acts in a position spaced apart from a center of the first movable body.

13. A camera module, comprising:

a lens module comprising one or more lenses;

a housing accommodating the lens module;

a fixed body coupled to the housing;

a first movable body and a second movable body accommodated in the fixed body and spaced apart from each other in an optical axis direction; and an image sensor disposed on one surface of the first movable body, wherein the first movable body and the second movable body move together in a direction perpendicular to an optical axis direction, and the first movable body is configured to rotate, relative to the second movable body.

14. The camera module of claim 13, further comprising:

a first ball member disposed between the fixed body and the second movable body and configured to support the second movable body such that the second movable body moves in first and second axial directions perpendicular to the optical axis direction; and a second ball member disposed between the first movable body and the second movable body and configured to support the first movable body such that the first movable body rotates.

15. The camera module of claim 14, wherein three or more first ball members are provided, and one of the second ball members is provided, and wherein a center of gravity of the first movable body overlaps the second ball member in the optical axis direction.

16. The camera module of claim 13, further comprising:

a first driver configured to move the first movable body and the second movable body in a first axial direction perpendicular to the optical axis direction, a second driver configured to move the first movable body and the second movable body in a second axial direction perpendicular to the optical axis direction, and a third driver configured to rotate the first movable body relative to the second movable body.

17. A sensor actuator, comprising:

a first movable body;

an image sensor having an imaging plane disposed on the first movable body; and a driver comprising:
   a first magnet facing a first coil on the first movable body to drive the first movable body in a first direction parallel to the imaging plane,
   a second magnet facing a second coil on the first movable body to drive the first movable body in a second direction parallel to the imaging plane and crossing the first direction, and
   one or more of a third magnet facing a third coil on the first movable body to rotate the first movable body about the first direction and/or the second direction, and a fourth magnet facing a fourth coil on the first movable body to rotate the first movable body about a direction perpendicular to the first and second directions.

18. The sensor actuator of claim 17, further comprising a second movable body, wherein the first movable body is disposed on the second movable body, wherein the second movable body moves in the first and second directions with the first movable body, and wherein the first movable body rotates about one or more of the first direction and/or the second direction and the direction perpendicular to the first and second directions, relative to the second movable body.

19. The sensor actuator of claim 18, further comprising a first ball member and a second ball member, wherein the second movable member is disposed on the first ball member, the second ball member is disposed on the second movable member, and the first movable member is disposed on the second ball member.

20. A camera module, comprising:

a lens module comprising one or more lenses;

a housing accommodating the lens module;

a fixed body coupled to the housing; and the sensor actuator of claim 17 accommodated in the fixed body, wherein light passing through the one or more lenses is incident on the imaging plane.

* * * * *